United States Patent
Levy et al.

(10) Patent No.: US 7,870,503 B1
(45) Date of Patent: Jan. 11, 2011

(54) TECHNIQUE FOR ANALYZING AND GRAPHICALLY DISPLAYING DOCUMENT ORDER

(75) Inventors: Philip Levy, Los Altos, CA (US); Paul C. Anderson, Lakeside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 487 days.

(21) Appl. No.: 11/215,966

(22) Filed: Aug. 30, 2005

(51) Int. Cl.
*G06F 3/048* (2006.01)

(52) U.S. Cl. .................. 715/783; 715/788; 715/910; 715/911; 715/907

(58) Field of Classification Search .................. 715/783, 715/788, 910, 911, 907
See application file for complete search history.

(56) References Cited

U.S. PATENT DOCUMENTS

| | | | | |
|---|---|---|---|---|
| 5,825,944 A * | 10/1998 | Wang | ........................ | 382/309 |
| 5,848,184 A * | 12/1998 | Taylor et al. | ................ | 382/173 |
| 5,956,738 A * | 9/1999 | Shirakawa | .................. | 715/273 |
| 6,070,176 A * | 5/2000 | Downs et al. | ............... | 715/234 |
| 6,549,221 B1 * | 4/2003 | Brown et al. | ................ | 715/854 |
| 7,315,979 B1 * | 1/2008 | Walker | ........................ | 715/234 |
| 7,536,561 B2 * | 5/2009 | Warnock et al. | ............ | 713/193 |
| 7,555,711 B2 * | 6/2009 | Chao et al. | ................... | 715/246 |
| 2001/0054049 A1 * | 12/2001 | Maeda et al. | ............... | 707/517 |
| 2002/0122067 A1 * | 9/2002 | Geigel et al. | ................ | 345/788 |
| 2003/0056177 A1 * | 3/2003 | Nara et al. | ................... | 715/525 |
| 2005/0050452 A1 * | 3/2005 | Weitzel et al. | .............. | 715/513 |
| 2005/0094208 A1 * | 5/2005 | Mori | .......................... | 358/1.18 |
| 2006/0053122 A1 * | 3/2006 | Korn et al. | ................... | 707/100 |
| 2006/0080325 A1 * | 4/2006 | Meuer | ........................ | 707/100 |

OTHER PUBLICATIONS

Hardy, Nov. 20-22, 2003, "Creating Reusable Well-Structured PDF as a Sequence of Component Object Graphic(COG) Elements".(Section 6.2), ACM.*
Hardy, Nov. 8-9, 2002, "Mapping and Displaying Structural Transformations between XML and PDF". ACM.*
Hardy, Oct. 28-30, 2004, Creating Structured PDF Files Using XML Templates. ACM.*

* cited by examiner

*Primary Examiner*—William L Bashore
*Assistant Examiner*—David Phantana-angkool
(74) *Attorney, Agent, or Firm*—Van Pelt, Yi & James LLP (57) ABSTRACT

Displaying ordered items is disclosed. Ordered items are analyzed to determine at least one set of groupable items. The groupable items are combined into a group. Group order associated with the group is determined. The group, along with an indicia of the group order, is displayed. The group can be reordered to modify the order of the items.

28 Claims, 10 Drawing Sheets

TECHNIQUE FOR ANALYZING AND GRAPHICALLY DISPLAYING DOCUMENT ORDER

BACKGROUND OF THE INVENTION

Screen readers can aid visually impaired users in reading electronic documents. Contents of an electronic document typically contain a correct document flow order for a screen reader to properly read the document. Document flow order specifies a traversal order of document contents. In electronic document formats (e.g., Adobe PDF), document flow order may be specified by a document structure tree (e.g., tag tree) that identifies document items along with their roles and relationships within the document. Item identifiers may be ordered within the document structure tree to reflect correct document flow order. Besides document accessibility, flow order is useful for content recovery (e.g., extracting content from a document), and document reflow (e.g., reshaping document contents to fit a different layout).

Since document flow order is not easily verifiable by a document creator, document reading order is often neglected and consequently incorrect for many documents. For example when the title of a document should be read first, a screen reader may not read the title first if the title is placed in the middle of a document page layout and also placed in the middle of the structure tree traversal order. Document flow order may be corrected by traversing the document structure tree and individually identifying item order in the structure tree to either verify or alter document items so that they are in correct flow order. This verification and correction process can be tedious and time consuming due to the potentially large number of document items and the complexity of traversing the structure tree. Therefore, there exists a need to efficiently verify and modify flow order of content in an electronic document.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analyzing and graphically displaying document flow order is disclosed. In some embodiments, document content items are analyzed to determine groupable items. In some embodiments, items are groupable if items located in adjacent reading order are of similar item type. For example, adjacent sentences in the same paragraph are groupable, whereas paragraphs side by side in two different columns are not groupable since they are not located in adjacent reading order. The groupable items are grouped and displayed along with an indicia of the group order within the document flow order.

Figure 1:
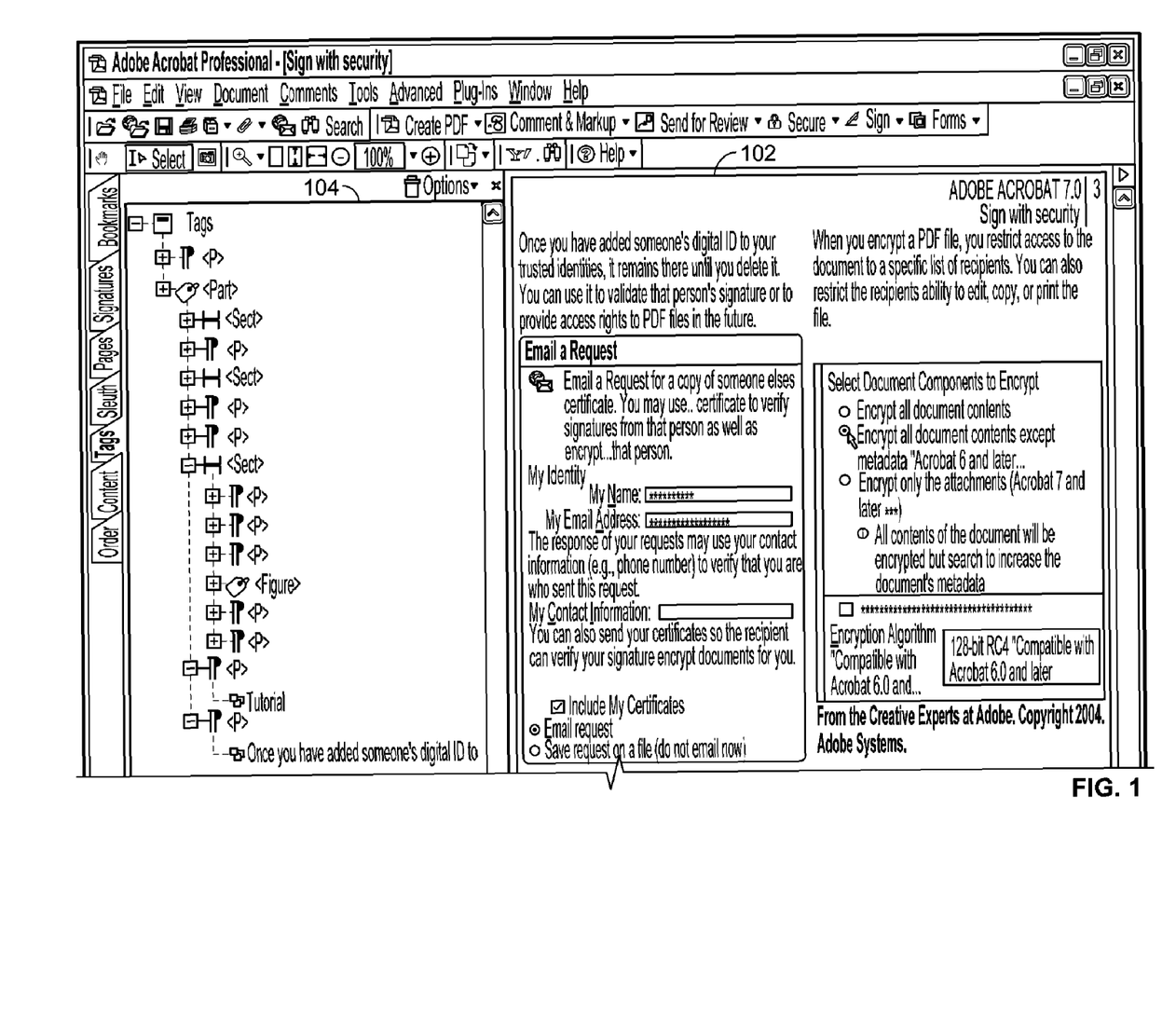
FIG. 1 is a diagram illustrating an embodiment of an electronic document graphical display and an associated structure tree.

FIG. 1 is a diagram illustrating an embodiment of an electronic document graphical display and an associated structure tree. In this example, box 102 outlines a graphical representation of a PDF document page. A document includes document content items that compose the document. The content items may include, for example, text, alphanumeric characters, document format indicators, tables, images, other imbedded document contents, associated formatting information, attribute information, and/or metadata. A content item may include one or more other content items. A content item may have one or more associated item types, including a paragraph type, a table of contents type, a header type, a footer type, a cell type, a list type, a structure type, a figure type, and a user defined type. The relationship between the document content items and/or the relationship of a content item to the document may be described using a document structure representation. One such representation is a document structure tree. In some embodiments, leaves of the structure tree represent document items. In the example shown, a tag structure tree outlined in box 104 represents the structure of the document page. Tag items are organized in a hierarchy under associated structure tags. For example, paragraph tag items are organized under the "<P>" tag and imbedded images within the document are organized under the "<Figure>" tag. Other document tags exist.

Since the document flow order can be determined from the structure tree using the tree organization and associated information, a screen reader or any document traversal process may follow the structure tree order of items to determine the document flow order. Correct document flow order may be verified by manually traversing the structure tree. For each corresponding item in the structure tree, a layout location of the item is determined and verified to ensure that the item's order in the structure tree matches the correct layout order of the contents. If the structure tree order does not match the correct order, the structure tree may be modified to reflect the correct order. Verification tends to be long and tedious when there exists a larger number of items in the structure tree.

Figure 2:
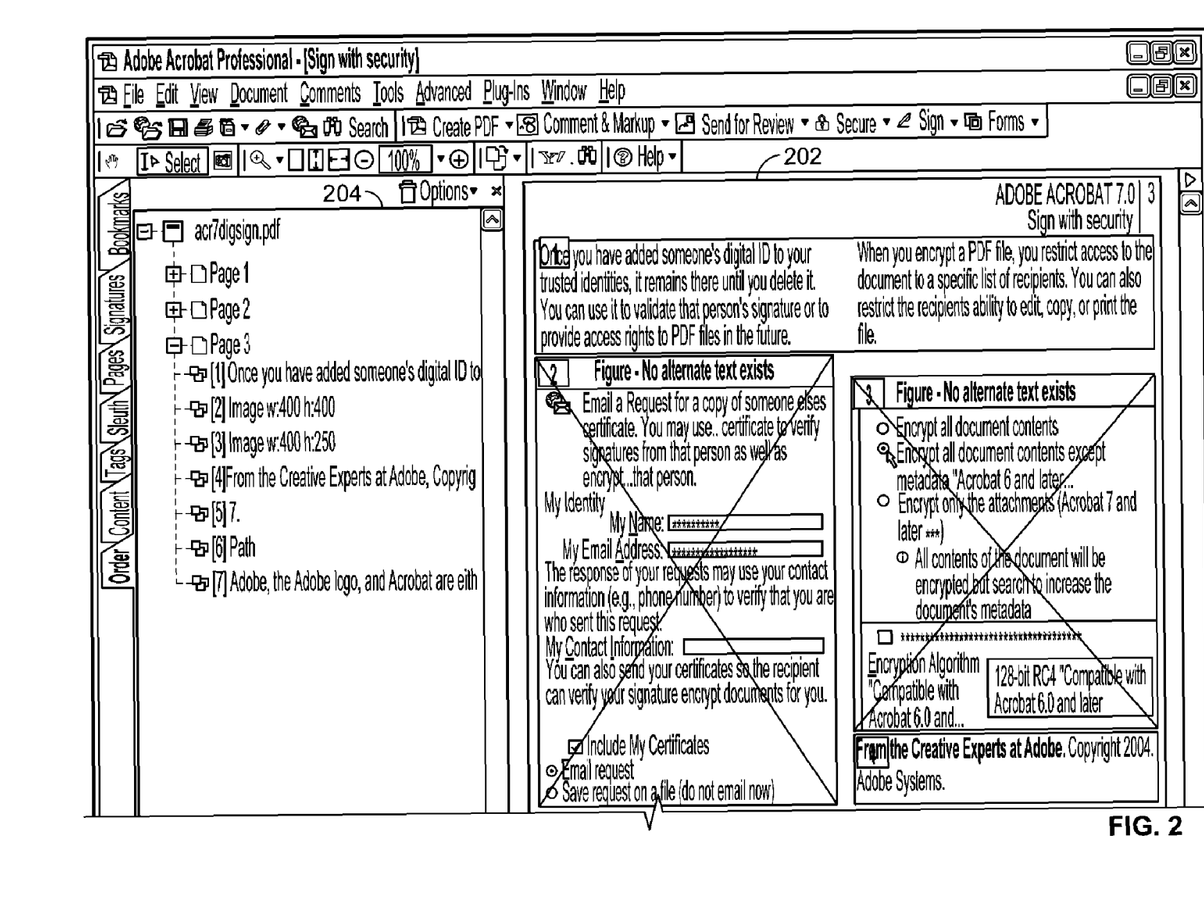
FIG. 2 is a diagram illustrating an embodiment of an electronic document graphical display with grouped document items.

FIG. 2 is a diagram illustrating an embodiment of an electronic document graphical display with grouped document items. Grouping document content into a fewer number of entities can ease the complexity of managing and verifying large numbers of items. In some embodiments, contents may be grouped if the content items are of a similar type, next to each other in layout order, and/or in adjacent structure order. Structure order may be determined from any document structure data, including document tag tree and/or underlying document organization data. In this example, box 204 outlines a graphical tree representation of the grouped items. In the example shown, the groups are numbered and organized under document pages. In this example, one page is shown. Box 202 shows a document layout representation with graphical highlights around groups of displayed document items. In some embodiments, a flow order indicia is associated with one or more groups. The indicia may be displayed on the graphical representation of a document. In the example shown in FIG. 2, the group order does not correspond with the correct document flow order. Using the United States standard reading order of Left-to-Right—Top-to-Bottom, groups should be numbered from the left column to the right column, within each column from top of the page to the bottom of the page.

Figure 3:
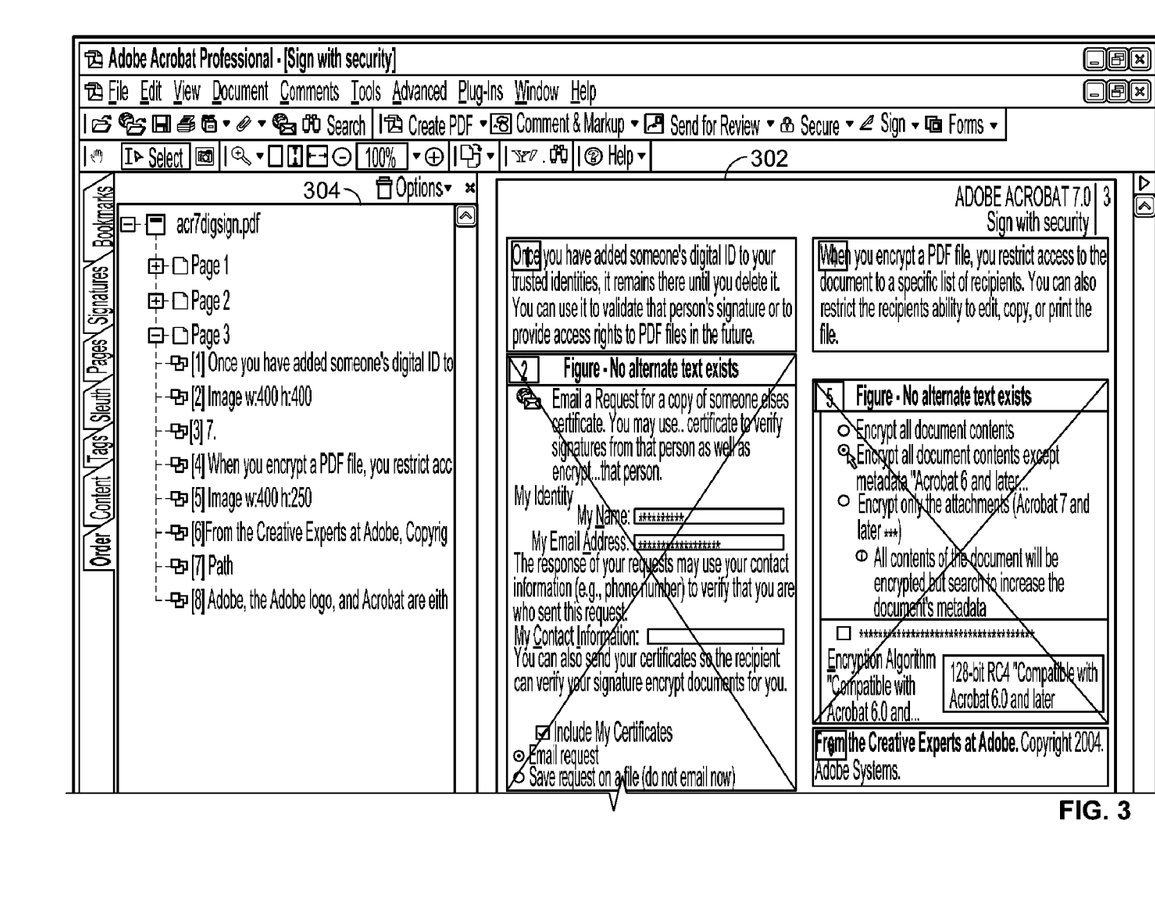
FIG. 3 is a diagram illustrating an embodiment of an electronic document graphical display with reordered document content groups.

FIG. 3 is a diagram illustrating an embodiment of an electronic document graphical display with reordered document content groups. In some embodiments, FIG. 3 illustrates the document of FIG. 2 after reordering of content groups. Content groups may be reordered and/or redefined within a document to reflect correct document flow order. Box 302 outlines the reordered document layout representation, and box 304 outlines the reordered group list representation. In some embodiments when groups are reordered, content items associated with each group are reordered in the underlying structural representation of the document. For example, when a group is reordered, the tag structure tree and any underlying document order information may be updated to reflect the reordering of the content group. Reordering a content group allows a screen reader or any document traversal process to follow the reordered document flow order of the groups, structure tree, and/or any underlying document order information. Groups may be reordered by any input method, including, for example, key commands, voice commands, and pointing device inputs. In the example shown, graphical group representations (e.g., icons) may be dragged and dropped to reorder groups within the group tree representation or the document layout representation. Groups may be redefined to correct document reading order. Redefining a group may include one or more of the following: combining the group with one or more other groups into one group, splitting the group into two or more groups, and adding or removing one or more items in the group. In the example shown, by splitting region "1" and reordering groups by selecting and dragging numbered regions to appropriate places within the document page, the regions may be placed in proper reading order. In some embodiments, the graphical indicia may be selected to edit the indicia number by typing the correct indicia number. The indicia may be any one or more alphanumeric characters or symbols that can convey order. In some embodiments, the indicia is automatically assigned or assigned through a wizard process. Reordering one flow order representation can reorder other flow order representations as well.

PDF document format and the tag tree are merely illustrative examples. Other document formats and other document structure information may be used. In some embodiments, a XML document format may be used. In some embodiments, other underlying PDF document structure information is used.

Figure 4:
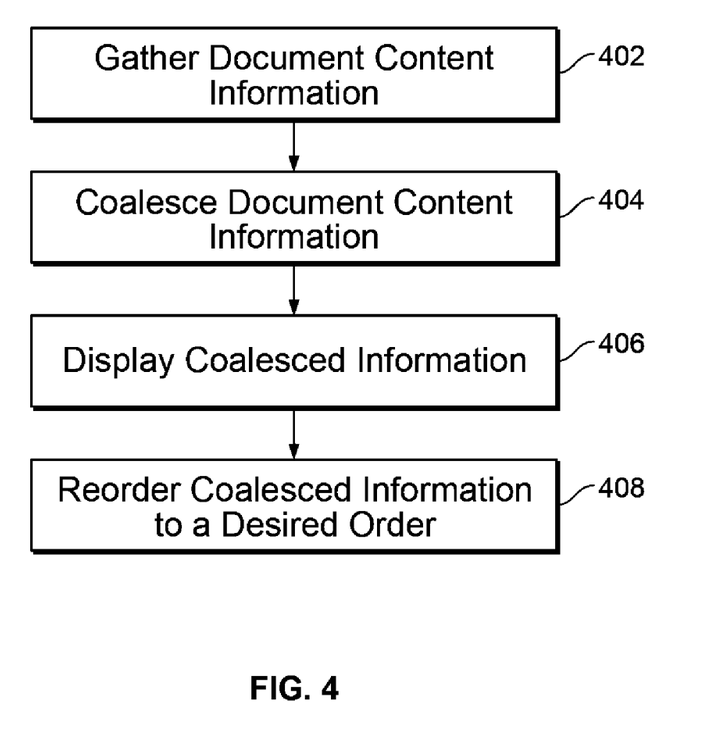
FIG. 4 is a flow chart illustrating an embodiment of a process for grouping and reordering an electronic document.

FIG. 4 is a flow chart illustrating an embodiment of a process for grouping and reordering an electronic document. At 402, document content information is gathered. In some embodiments, document content information includes at least one data that can be used determine a flow order of the document items. For example, a tag tree information may be gathered and/or generated. In some embodiments, underlying document structure information is gathered. At 404, document content information is coalesced. Coalescing may include grouping similar document items in adjacent reading order. At 406, the coalesced information is displayed. Displaying coalesced information may include, for example, displaying document content groups, listing content groups in a list, and/or displaying content group order indices. For example, the display of groups may include any geometric or irregular shape outline around the contents belonging to a group. In some embodiments, the groups are graphically shaded or colored. One or more different shades or colors associated with each group may visually indicate different groupings of content. A content group list may be organized in a data tree and displayed in a content panel. Group order indices may be graphically displayed on the graphical representation of a document or on a graphical group list. In some embodiments if the content groups contain items that should not be grouped together, the group may be broken up into smaller entities. At 408, the coalesced information is reordered to a desired flow order. If the content groups are already in the desired flow order, content groups are not reordered. Content groups may be reordered by any input method, including, for example, key commands, voice commands, and pointing device inputs. In either the document layout view or the content group list view, document order may be modified by both selecting and dragging appropriate text or icon items. One or more indices may be replaced by typing the correct indicia using any input device. In various embodiments, document flow order is modified using an application wizard or modified automatically using configuration settings that may be preconfigured or dynamically configured.

Figure 5:
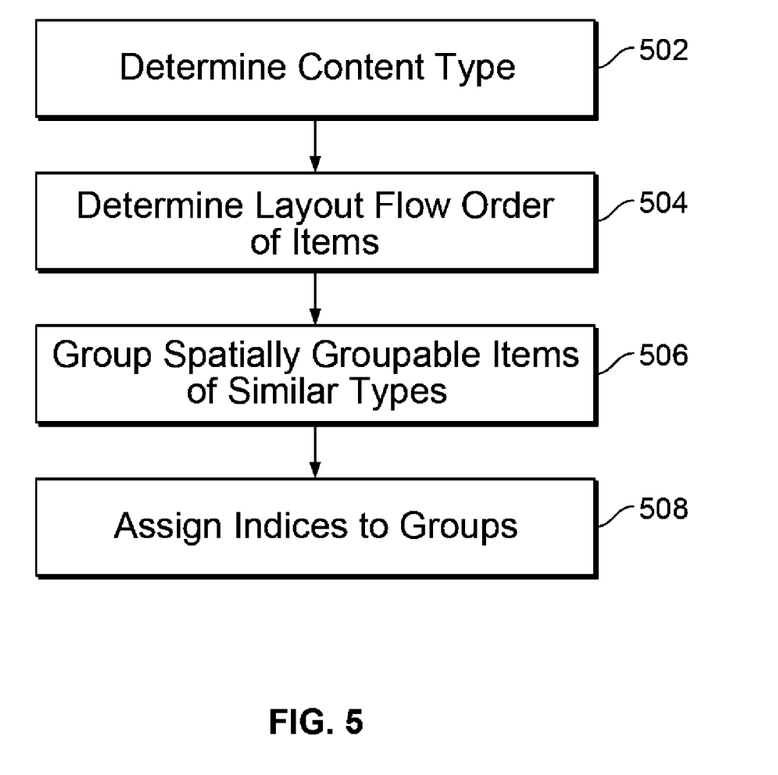
FIG. 5 is a flow chart illustrating an embodiment of a process for coalescing document item information.

FIG. 5 is a flow chart illustrating an embodiment of a process for coalescing document item information. In some embodiments, coalescing document content information at 404 of FIG. 4 includes the process of FIG. 5. At 502, content item types are determined. Type information may include data that may be used to determine if items can be grouped. For example, a tagged PDF document item may be a paragraph type, a table of contents type, a header type, a footer type, a cell type, a content type, a list type, a structure type, a figure type, and/or a user defined type. Other types may exist. Items may be groupable if they are of a similar type. In some embodiments, two types are similar if they are of the same type, preconfigured to be groupable (e.g., a caption text may be preconfigured to be groupable with the associated figure), or determined to be groupable using a role map that maps types to an associated base type. For example, an item with a user defined type associated with a paragraph base type may be grouped together with another item of a paragraph base type. At 504, layout order of items is determined. For example, layout order determination could include using standard reading order to determine the document reading traversal order. Standard reading order may be preconfigured or dynamically configured. For example, typically in English, standard reading order is Left-to-Right—Top-to-Bottom, in Hebrew, it is Right-to-Left—Top-to-Bottom, and in Japanese, reading order could be Top-to-Bottom—Right-to-Left. A document may have more than one standard reading order. One or more standard reading orders for a document could be specified in the document or automatically determined by examining the document. In some instances, standard reading order can be stylistically varied in a language. Stylistic order variations include stylistic layout configurations that determine document flow order. For example, document formatting such as columns, lists, outlines, figures, charts, and other possible document formatting is taken into account when determining document flow order. At 506, spatially groupable items of similar types are grouped together. Spatially groupable items may include items adjacent in layout order. The process of grouping may include generating new grouping data and/or modifying underlying document structure data. In some embodiments, the grouping data is stored with the document. At 508, indices are assigned to the groups. The indices are associated with the flow order of the document. Indicia assignment may be determined using underlying document order information (e.g., tag data) and/or graphical layout of the document or in any other appropriate way. Assigning the indices may include modifying underlying document data, saving indicia data, and/or displaying indices.

Figure 6:
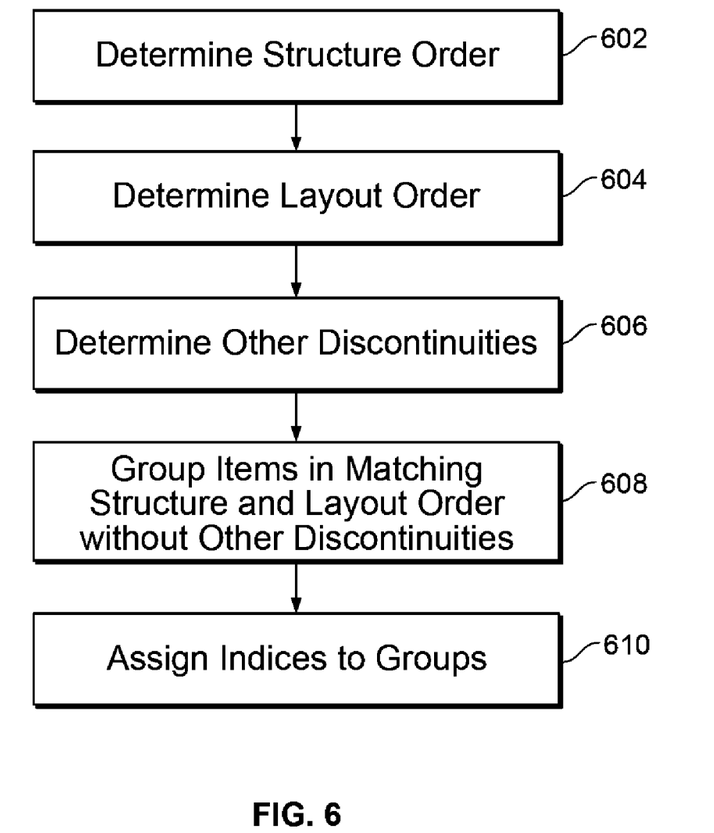
FIG. 6 is a flow chart illustrating an embodiment of a process for processing document item information.

FIG. 6 is a flow chart illustrating an embodiment of a process for processing document item information. In some embodiments, 404 of FIG. 4 includes the process of FIG. 5. At 602, structure order of the document is determined. Determining structure order may include using document structure information contained in the document to determine document content flow order. For example, document flow is determined from the tag structure tree list order. At 604, layout order of the document is determined. Layout order determination may include using standard reading order and stylistic document order to determine the document flow order. At 606, other discontinuities in the document are determined. Determining other discontinuities may include identifying content items that cannot be grouped together. For example, two items may not be combined if the items are not similar type items. In some embodiments, one or more preconfigured rules may be used to identify items that cannot be combined together. At 608, the determined structure order and layout order are compared. For example, if the structure order and the layout order matches for at least a portion of the document and other discontinuities have not been identified between items in the matching portion, the matching items are grouped together. In some embodiments, all document items are seen as groupable. As structure order and layout order are determined and compared, discontinuities where the orders do not match are identified. Using other discontinuities determined at 606, more discontinuities are identified. Within the boundaries of all identified discontinuities, document content items are grouped. At 610, indices are assigned to the groups. Indicia assignment may be determined using either or both structure and layout information.

Figure 7A:
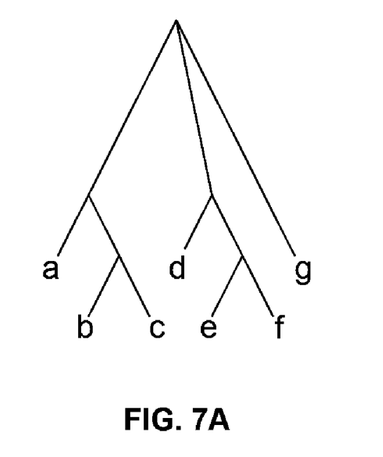
FIG. 7A is a tree diagram illustrating an example of a document item organization tree.

FIG. 7A is a tree diagram illustrating an example of a document item organization tree. In this example, items a, b, c, d, e, f, and g represent document items organized in the structure organization tree. The tree of FIG. 7A may represent a tag structure tree. From the tree organization, one determinable structure order of the document from the first item to the last item is a, b, c, d, e, f, g. In some embodiments, 602 of FIG. 6 includes reading or generating a document content organization tree and determining structure order.

Figure 7B:
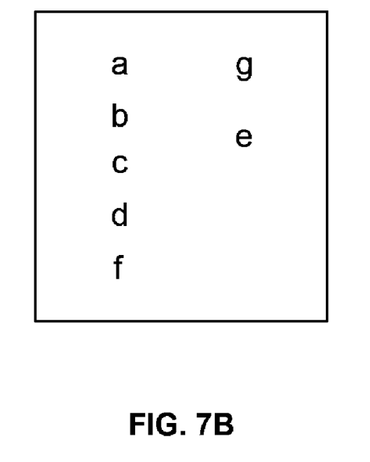
FIG. 7B is a diagram illustrating an example of a document with content items.

FIG. 7B is a diagram illustrating an example of a document with content items. In this example, the document contains items a, b, c, d, e, f, and g organized into two columns. Using standard English reading order (Left-Right—Top-Bottom), layout order from the first item to the last item is a, b, c, d, f, g, e. In some embodiments, 604 of FIG. 6 includes determining layout order.

Figure 7C:
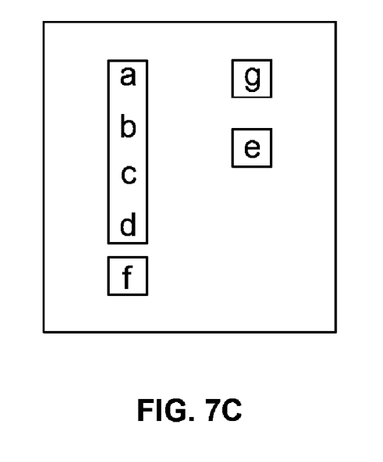
FIG. 7C is a diagram illustrating an example of a document with matching structure and layout items grouped.

FIG. 7C is a diagram illustrating an example of a document with matching structure and layout items grouped. Since the order of a, b, c, d match in both structure and layout order, they are grouped together. The order of items f, g, and e do not match between the structure and layout orders and consequently are not grouped together.

Figure 7D:
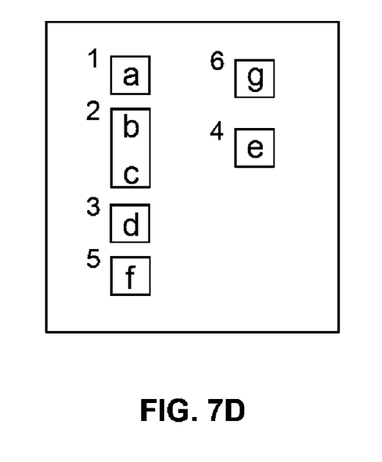
FIG. 7D is a diagram illustrating an example of a document with matching structure and layout order items grouped with other discontinuities taken into account.

FIG. 7D is a diagram illustrating an example of a document with matching structure and layout order items grouped with other discontinuities taken into account. In the example tree shown in FIG. 7A, items "b" and "c" belong to a separate subtree from items "a" and "d". A discontinuity exists between item "a," items "b and c," and item "d." Only items b and care groupable when taking into account both matching order and other discontinuity information. In some embodiments, 608 of FIG. 6 includes taking into account both matching order and other discontinuity information in grouping items together. Groups in FIG. 7D have been assigned indices associated with flow order of the document. The indices are associated with the structure order. If the layout order is the correct traversal order of the document, the flow order may be corrected by any of the previously mentioned methods.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of displaying ordered items, including:
analyzing the ordered items, which are included in a document page layout, to determine at least one set of groupable items, wherein the groupable items are under a document page;
combining the set of groupable items into a group;
determining a group order for a document page layout associated with the group, wherein the group order does not correspond with a flow order of the document page;
displaying the group along with an indicia of the group order; and
in the event an indication associated with reordering the group is received:
modifying the group order for a document page layout without changing the document page layout using a processor, wherein the modified group order corresponds with the flow order of the document page; and
updating the display of the group to use the modified group order for an electronic document graphical display with the modified group order.

2. A method as recited in claim 1, wherein analyzing the ordered items includes analyzing item layout order.

3. A method as recited in claim 2, wherein analyzing item layout order includes analyzing items using a preconfigured or dynamically determined reading order based at least in part on user input, and wherein the modified group order and the flow order provides the reading order for a screen reader.

4. A method as recited in claim 3, wherein the reading order includes Left-to-Right—Top-to-Bottom, Right-to-Left—

Top-to-Bottom, Top-to-Bottom—Right-to-Left, or Top-to-Bottom—Left-to-Right reading order.

5. A method as recited in claim 3, wherein the reading order takes into account stylistic document reading order variations including column, lists, figures, charts, and other document formatting.

6. A method as recited in claim 1, wherein analyzing the ordered items includes analyzing item structure order.

7. A method as recited in claim 6, wherein structure order is based at least in part on one or more of the following: a structure tree, a tag tree, and underlying document organization data.

8. A method as recited in claim 1, wherein analyzing the ordered items to determine at least one set of groupable items includes identifying discontinuities that prohibit items from being grouped and determining items that do not have discontinuities to be groupable.

9. A method as recited in claim 8, wherein identifying discontinuities includes one or more of the following: comparing structure order and layout order, determining item types, and using preconfigured rules used to identify items that cannot be grouped together.

10. A method as recited in claim 1, wherein analyzing the ordered items includes comparing item types of the ordered items.

11. A method as recited in claim 10, wherein comparing item types includes one or more of the following: identifying same item types, identifying similar type items using a role map, and identifying item types preconfigured to be groupable.

12. A method as recited in claim 1, wherein the group order associated with the group is determined at least in part using layout order data or structure order data.

13. A method as recited in claim 1, wherein displaying the group along with an indicia of the group order includes displaying the list of groups.

14. A method as recited in claim 13, wherein the list is organized in a tree structure.

15. A method as recited in claim 1, wherein displaying the group along with the indicia of the group order includes one or more of the following: outlining document items contained in the group, highlighting items contained in the group, shading items contained in the group, and coloring items contained in the group.

16. A method as recited in claim 1, wherein the group is divided into two or more groups.

17. A method as recited in claim 1, wherein the items include a text item.

18. A method as recited in claim 1, wherein reordering the group modifies at least one of the following: structure tree order, tag tree order, and underlying document organization order.

19. A method as recited in claim 1, wherein reordering the group includes using one or more of the following: a key command, a voice command, a pointing device input, a wizard process, and an automatic process that can be preconfigured or dynamically configured.

20. A method as recited in claim 1, further comprising redefining the group, wherein redefining the group include one or more of the following: combining the group with one or more other groups into one group, splitting the group into two or more groups, and adding or removing one or more items in the group.

21. A system for displaying ordered items, comprising:
a processor configured to analyze the ordered items, which are included in a document page layout, to determine at least one set of groupable items, wherein the groupable items are under a document page, combine the set of groupable items into a group, determine a group order for a document page layout associated with the group, wherein the group order does not correspond with a flow order of the document page, and in the event an indication associated with reordering the group is received: modify the group order for the document page layout without changing the document page layout, wherein the modified group order corresponds with a flow order of the document page, and update the display of the group to use the modified group order for an electronic document graphical display with the modified group order; and
an interface configured to display the group along with an indicia of the group order.

22. A system as recited in claim 21, wherein the processor analyzes the ordered items including by analyzing item layout order.

23. A system as recited in claim 22, wherein analyzing item layout order includes analyzing items using a preconfigured or dynamically determined reading order, and wherein the modified group order and the flow order provides the reading order for a screen reader.

24. A system as recited in claim 21, wherein the processor analyzes the ordered items including by analyzing item structure order.

25. A system as recited in claim 24, wherein structure order is determined at least in part using one or more of the following: a structure tree, a tag tree, and underlying document organization data.

26. A system as recited in claim 21, wherein the processor analyzes the ordered items including by assuming all items to be groupable, identifying discontinuities that prohibit items from being grouped, and determining items that do not have discontinuities to be groupable.

27. A computer program product for displaying ordered items, the computer program product being embodied in a computer readable storage medium and comprising computer instructions for:
analyzing the ordered items, which are included in a document page layout, to determine at least one set of groupable items, wherein the groupable items are under a document page;
combining the set of groupable items into a group;
determining a group order for a document page layout associated with the group, wherein the group order does not correspond with a flow order of the document page;
displaying the group along with an indicia of the group order; and
in the event an indication associated with reordering the group is received:
modifying the group order for the document page layout without changing the document page layout, wherein the modified group order corresponds with a flow order of the document page; and
updating the display of the group to use the modified group order for an electronic document graphical display with the modified group order.

28. A computer program product as recited in claim 27, wherein analyzing the ordered items includes analyzing item layout order, and wherein analyzing item layout order includes analyzing items using a preconfigured or dynamically determined reading order based at least in part on user input, and wherein the modified group order and the flow order provides the reading order for a screen reader.

* * * * *